United States Patent
Oshiro et al.

(10) Patent No.: US 6,836,709 B2
(45) Date of Patent: Dec. 28, 2004

(54) METHOD AND APPARATUS FOR DETECTING DECREASE IN TIRE AIR-PRESSURE AND PROGRAM FOR JUDGING DECOMPRESSION OF TIRE

(75) Inventors: Yuji Oshiro, Kobe (JP); Akihiko Nakamura, Kobe (JP); Minao Yanase, Kobe (JP)

(73) Assignees: Sumitomo Rubber Industries, Ltd., Kobe (JP); Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 10/334,901

(22) Filed: Jan. 2, 2003

(65) Prior Publication Data

US 2003/0130773 A1 Jul. 10, 2003

(30) Foreign Application Priority Data

Jan. 9, 2002 (JP) .................................... 2002-002294
Apr. 19, 2002 (JP) .................................... 2002-117426

(51) Int. Cl.⁷ .......................... B60C 23/00; G06F 19/00
(52) U.S. Cl. .............................. 701/29; 701/1; 340/442; 340/444; 73/146.2; 73/146.5
(58) Field of Search ...................... 701/1, 29; 340/442, 340/443, 444, 445, 446, 447, 448; 73/146, 146.2, 146.4, 146.5

(56) References Cited

U.S. PATENT DOCUMENTS

| | | | | |
|---|---|---|---|---|
| 5,747,686 A | * | 5/1998 | Nishihara et al. | 73/146.2 |
| 5,866,812 A | * | 2/1999 | Nishihara et al. | 73/146.2 |
| 5,900,543 A | * | 5/1999 | Oshiro | 73/146.2 |
| 5,907,097 A | * | 5/1999 | Nakajima | 73/146.2 |
| 5,936,519 A | * | 8/1999 | Nakajima et al. | 340/444 |
| 6,060,983 A | * | 5/2000 | Yanase et al. | 340/442 |
| 6,137,400 A | * | 10/2000 | Yanase et al. | 340/442 |
| 6,530,271 B2 | * | 3/2003 | Kawasaki et al. | 73/146.2 |
| 6,604,040 B2 | * | 8/2003 | Kawasaki et al. | 701/80 |
| 2002/0105419 A1 | * | 8/2002 | Sugisawa | 340/442 |
| 2003/0156023 A1 | * | 8/2003 | Kawasaki et al. | 340/443 |
| 2003/0187607 A1 | * | 10/2003 | Oshiro | 702/140 |

FOREIGN PATENT DOCUMENTS

| | | |
|---|---|---|
| EP | 0-291-217 A2 | 11/1988 |
| EP | 0554-131 A1 | 8/1993 |
| EP | 1-106-398 A2 | 6/2001 |
| JP | 07-47820 | 2/1995 |
| JP | 07-52621 | 2/1995 |

* cited by examiner

*Primary Examiner*—Gary Chin
(74) *Attorney, Agent, or Firm*—Birch, Stewart, Kolasch & Birch, LLP

(57) ABSTRACT

A method for detecting decrease in tire air-pressure on the basis of rotational information obtained from tires attached to a vehicle. The method includes the steps of: detecting rotational information of the respective tires; storing the rotational information of the respective tires; obtaining an acceleration/deceleration of the vehicle; obtaining a slip rate when the acceleration/deceleration of the vehicle is within a specified range proximate to zero; comparing the slip rate with a slip rate which has been preliminarily obtained when the tire is under normal air pressure; and judging simultaneous decompression of both front wheel tires or simultaneous decompression of both rear wheel tires on the basis of a relationship between a value obtained through comparison of the two slip rates and a specified threshold. It is possible to judge simultaneous decompression of both front wheel tires or both rear wheel tires when employing the present invention.

3 Claims, 3 Drawing Sheets

METHOD AND APPARATUS FOR DETECTING DECREASE IN TIRE AIR-PRESSURE AND PROGRAM FOR JUDGING DECOMPRESSION OF TIRE

BACKGROUND OF THE INVENTION

1. Field of the Invention

The present invention relates to a method and an apparatus for detecting decrease in tire air-pressure and a program for judging decompression of a tire. More particularly, it relates to a method and apparatus for detecting decrease in tire air-pressure and a program for judging decompression of a tire with which it is possible to detect simultaneous decompression of two wheel tires of both front wheels or rear wheels.

2. Description of Background Art

An apparatus for detecting decrease in tire air-pressure (DWS) in which decompression of a tire is detected on the basis of rotational (wheel speed) information of four wheel tires attached to a vehicle is conventionally known. Such an apparatus employs a theory that a rotational velocity or a rotational angular velocity of a decompressed tire is increased when compared to remaining normal tires owing to a decrease in outer diameter (dynamic load radius of the tire) from that of a tire of normal internal pressure. In a method for detecting decrease in internal pressure on the basis of a relative difference in rotational angular velocities of tires (reference should be made to Japanese Unexamined Patent Publication No. 305011/1988), $$DEL=\{(F1+F4)/2-(F2+F3)/2\}/\{(F1+F2+F3+F4)/4\}\times100(\%)$$

is employed as a judged value DEL. Here, F1 to F4 denote rotational angular velocities of a front left tire, a front right tire, a rear left tire and a rear right tire, respectively.

However, since decompression is judged on the basis of a difference in sums of rotational angular velocities of the four wheels which are respectively located diagonally with respect to each other, it is impossible to detect simultaneous decompression of both front wheels or both rear wheels. It therefore exists the danger that fuel consumption is worsened through increase in rolling resistance of the tire and that a burst might be caused upon continuing running without being aware of decompression.

SUMMARY OF THE INVENTION

In view of the above facts, it is an object of the present invention to provide a method and an apparatus for detecting decrease in tire air-pressure and a program for judging decompression of a tire with which it is possible to detect simultaneous decompression of two wheel tires of both front wheels or both rear wheels.

In accordance with the present invention, there is provided a method for detecting decrease in tire air-pressure in which decrease in internal pressure of a tire is detected on the basis of rotational information obtained from tires attached to a vehicle. The method includes the steps of: detecting rotational information of the respective tires; storing the rotational information of the respective tires; obtaining an acceleration/deceleration of the vehicle; obtaining a slip rate when the acceleration/deceleration of the vehicle is within a specified range proximate to zero; comparing the slip rate with a slip rate which has been preliminarily obtained when the tire is under normal air pressure; and judging simultaneous decompression of both front wheel tires or simultaneous decompression of both rear wheel tires on the basis of a relationship between a value obtained through comparison of the two slip rates and a specified threshold.

Also, in accordance with the present invention, there is provided an apparatus for detecting decrease in tire air-pressure in which decrease in internal pressure of a tire is detected on the basis of rotational information obtained from tires attached to a vehicle. The apparatus includes: rotational information detecting means for detecting rotational information of the respective tires; a rotational information storing means for storing the rotational information of the respective tires; an acceleration/deceleration calculating means for obtaining an acceleration/deceleration of the vehicle; a slip rate calculating means for obtaining a slip rate when the acceleration/deceleration of the vehicle is within a specified range proximate to zero; a slip rate comparison means for comparing the slip rate with a slip rate which has been preliminarily obtained when the tire is under normal air pressure; and a decompression judging means for judging simultaneous decompression of both front wheel tires or simultaneous decompression of both rear wheel tires on the basis of a relationship between a value obtained through comparison of the two slip rates and a specified threshold.

Moreover, in accordance with the present invention, there is provided a program for judging decompression of a tire, in which for judging decrease in tire air-pressure, a computer is made to function as a rotational information storing means for storing the rotational information of the respective tires; an acceleration/deceleration calculating means for obtaining an acceleration/deceleration of the vehicle; a slip rate calculating means for obtaining a slip rate when the acceleration/deceleration of the vehicle is within a specified range proximate to zero; a slip rate comparison means for comparing the slip rate with a slip rate which has been preliminarily obtained when the tire is under normal air pressure; and a decompression judging means for judging simultaneous decompression of both front wheel tires or simultaneous decompression of both rear wheel tires on the basis of a relationship between a value obtained through comparison of the two slip rates and a specified threshold.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION

The method and apparatus for detecting decrease in tire air-pressure and the program for judging decompression of a tire according to the present invention will now be explained on the basis of the accompanying drawings.

Figure 1:
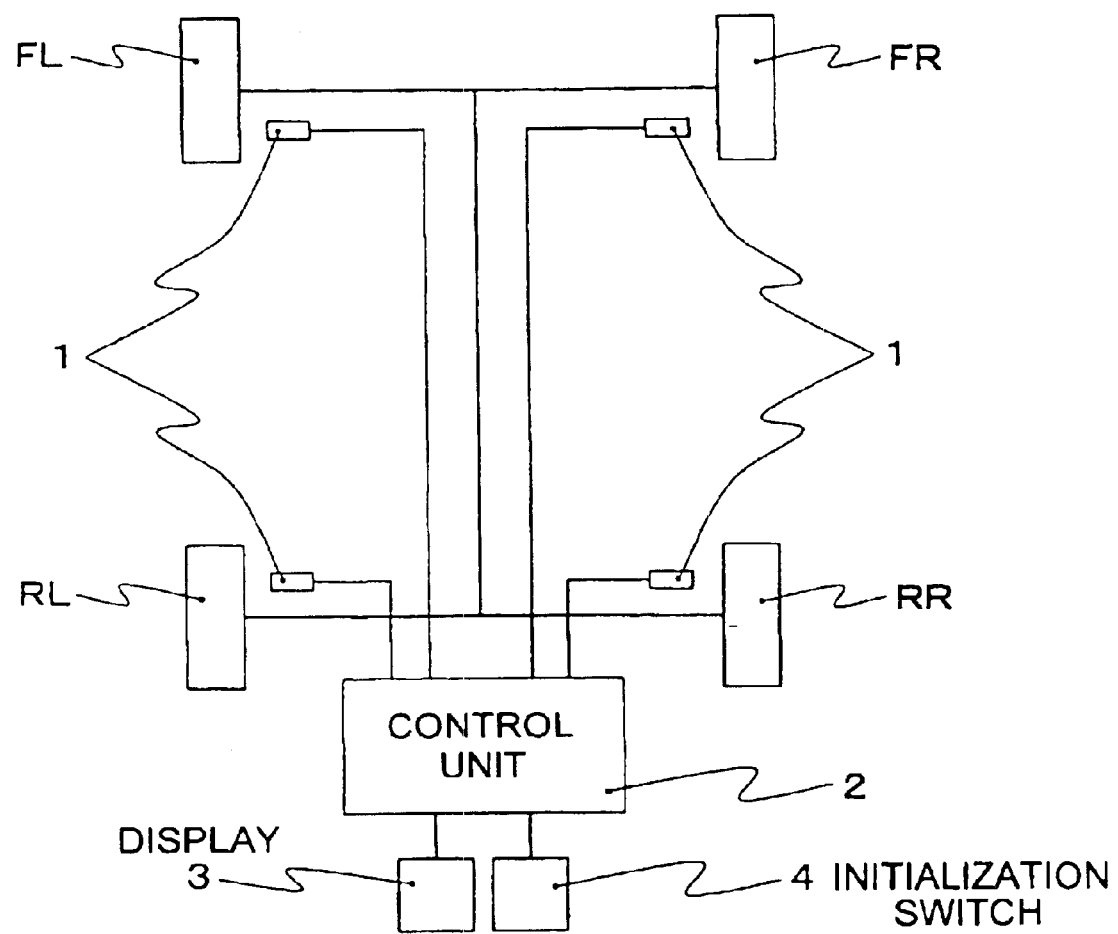
FIG. 1 is a block diagram illustrating one embodiment of an apparatus for detecting decrease in tire air-pressure according to the present invention.

As illustrated in FIG. 1, the apparatus for detecting decrease in tire air-pressure according to one embodiment of the present invention is for detecting whether an air-pressure of four tires FL, FR, RL and RR (generally referred to as Wi, wherein i=1 to 4, 1: front left tire, 2: front right tire, 3: rear left tire and 4: rear right tire) mounted to a four-wheeled vehicle is reduced or not, and comprises ordinary rotational information detecting means 1 provided in relation to the respective tires Wi.

The rotational information detecting means 1 might be a wheel speed sensor for measuring wheel speeds (rotational speeds) on the basis of number of pulses upon generating rotational pulses by using an electromagnetic pickup or similar, or an angular velocity sensor in which power is generated by using rotation such as in a dynamo whereupon the wheel speeds are measured by using this voltage. Outputs of the rotational information detecting means 1 are sent to a control unit 2 comprising a computer such as an ABS. A display 3 composed of liquid crystal elements, plasma display elements or CRT to display decompressed tires Wi, and an initialization switch which can be operated by a driver are connected to the control unit 2.

Figure 2:
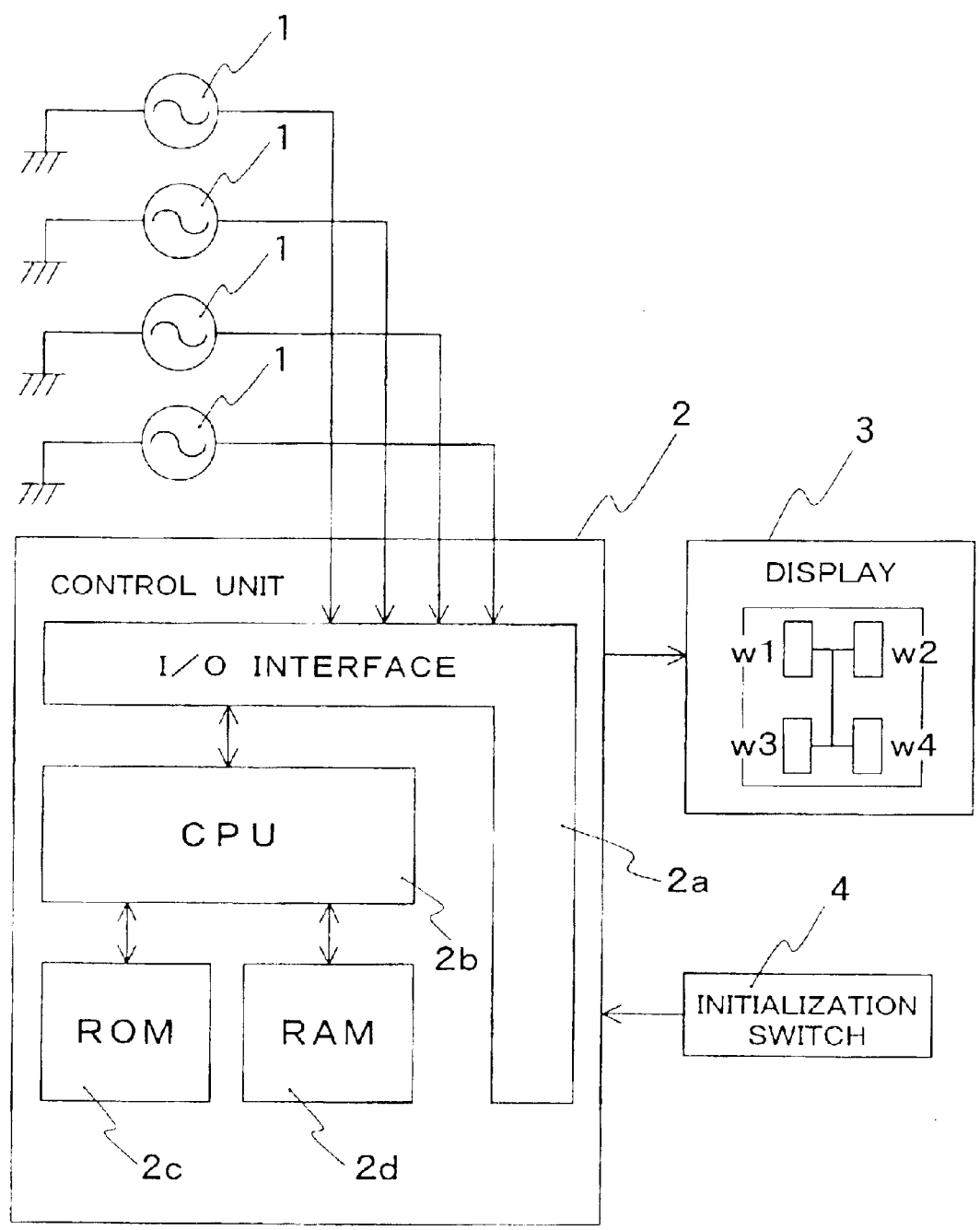
FIG. 2 is a block diagram illustrating electric arrangements of the apparatus for detecting decrease in tire air-pressure of FIG. 1.

The control unit 2 comprises, as illustrated in FIG. 2, an I/O interface $2a$ required for sending/receiving signals to/from an external device, a CPU $2b$ which functions as a center of calculation, a ROM $2c$ which stores a control operation program for the CPU $2b$, a RAM $2d$ into which data are temporally written and are read out therefrom when the CPU $2b$ performs control operations, and an EEPROM $2e$ into which an initial learning value and updated values are written.

Pulse signals corresponding to the rotational number of tires Wi (hereinafter referred to as "wheel speed pulse") are output from the rotational information detecting means 1. In the CPU $2b$, rotational angular velocities $F_i$ for respective tires Wi are calculated on the basis of the wheel speed pulses as output from the wheel speed sensors 1 at specified sampling periods $\Delta T$(sec), for instance, $\Delta T=40$ msec.

Since the tires Wi are manufactured to include variations (initial differences) within standards, effective rolling radius of the respective tires Wi (a value obtained by dividing a distance which has been traveled by a single rotation by $2\pi$) are not necessarily identical to one another even though all of the tires Wi are under normal internal pressure. This will result in variations in the rotational angular velocities $F_i$ of the respective tires Wi. Thus, corrected rotational angular velocities $F1_i$ to cancel variations owing to initial differences are calculated. More particularly, corrections are performed to satisfy $F1_1=F_1$ $F1_2=mF_2$ $F1_3=F_3$ $F1_4=nF_4$ The correction coefficients m and n are obtained as $m=F_1/F_2$ and $n=F_3/F_4$ on the basis of rotational angular velocities $F_i$ which have been calculated on the premise that the vehicle is performing straight-ahead driving. The wheel speed Vi of the tires of the respective wheels is calculated on the basis of the above $F1_i$.

While a slip rate obtained when running for a short time (slip rate when the acceleration/deceleration of the vehicle is proximate to zero) is generally employed for judging gradients of road surfaces, an average of the obtained slip rates will be a slip rate as obtained when running on a flat road (wheel speed ratio of front wheels and rear wheels) when the vehicle is running for a long period of time, for instance, one hour since the vehicle will run both uphill and downhill. When decompression is present, a radius of a decompressed tire becomes smaller whereas the wheel speed becomes larger so that the wheel speed ratio of the front wheels and rear wheels will change from that obtained under normal air pressure. It is accordingly possible to judge decompression by observing the slip rate.

According to the present embodiment, it is possible to determine that both front wheel tires or both rear wheel tires are simultaneously decompressed when a value obtained by comparing an average value of slip rates between the tire and the road surface with a slip rate which has been preliminarily obtained under normal air pressure, which might for instance be a difference, is not less than a specified threshold in the case where the acceleration/deceleration of the vehicle is within a specified range proximate to zero. It should be noted that it is possible to know that the driving wheels have decompressed when the average value of slip rates between the tire and the road surface is larger than the slip rate under normal air pressure, while it is possible to know that the following wheels have decompressed when this average value is smaller, and it can be further understood which of those are simultaneously decompressed when correspondences between driving wheels and following wheels, and front and rear wheels are known.

The present embodiment is composed of: rotational information detecting means 1 for detecting rotational information of respective tires Wi; a rotational information storing means for storing the rotational information of the respective tires Wi; an acceleration/deceleration calculating means for obtaining an acceleration/deceleration of the vehicle; a slip rate calculating means for obtaining a slip rate when the acceleration/deceleration of the vehicle is within a specified range proximate to zero; a slip rate comparison means for comparing the slip rate with a slip rate which has been preliminarily obtained when the tire is under normal air pressure; and a decompression judging means for judging simultaneous decompression of both front wheel tires or simultaneous decompression of both rear wheel tires on the basis of a relationship between a value obtained through comparison of the two slip rates and a specified threshold.

The program for judging decompression of a tire according to the present embodiment is so arranged that the control unit 2 is made to function as the rotational information storing means for storing the rotational information of the respective tires Wi; the acceleration/deceleration calculating means for obtaining an acceleration/deceleration of the vehicle; the slip rate calculating means for obtaining a slip rate when the acceleration/deceleration of the vehicle is within a specified range proximate to zero; the slip rate comparison means for comparing the slip rate with a slip rate which has been preliminarily obtained when the tire is under normal air pressure; and the decompression judging means for judging simultaneous decompression of both front wheel tires or simultaneous decompression of both rear wheel tires on the basis of a relationship between a value obtained through comparison of the two slip rates and a specified threshold.

The slip rate under normal air pressure is calculated upon making a vehicle run for a specified period of time in which the tires are known to be under normal air pressure and obtaining some slip rates when the acceleration/deceleration of the vehicle is proximate to zero, whereupon these data obtained during an hour of running are accumulated and averaged. The obtained slip rates under normal air pressure is stored in the EEPROM 2e so that they can be stored even if the ignition key of the vehicle is turned off.

In addition to the difference between two slip rates, the comparison value might be a ratio of two slip rates. The present embodiment will be explained by illustrating an example in which the comparison value is a difference between two slip rates.

In the present embodiment, the wheel speeds of the wheel tires of the four wheels are detected in not more than 1 second, and preferably not more than 0.05 second.

While the acceleration/deceleration of the vehicle can be obtained on the basis of detected signals by employing an acceleration sensor, the present invention is not limited to this arrangement, and it is possible to obtain the same from a differentiated value of the wheel speeds of the following wheels when the vehicle is a front-wheel drive vehicle or a rear-wheel drive vehicle.

The acceleration/deceleration of the vehicle is moving-averaged for each sampling time as an average value of data of a specified period of time, for instance, data of at least 0.1 second.

The slip rate when the moving-averaged acceleration/deceleration of the vehicle (acceleration/deceleration of the vehicle of a specified number) is within a specified range proximate to zero, for instance, ±0.005 G (wherein G denotes acceleration of gravity) is obtained.

When a plurality of slip rates satisfying the condition that the acceleration/deceleration of the vehicle is proximate to zero is present within the specified period of time, an average value of these slip rates is obtained.

Upon comparing the average value of the slip rates with the slip rate under normal air pressure, simultaneous decompression of both front wheel tires or simultaneous decompression of both rear wheel tires is judged.

Actions of the apparatus for detecting decrease in tire air-pressure according to the present embodiment will now be explained along with steps 1) to 7).

1) The wheel speeds ($V1_n$, $V2_n$, $V3_n$, and $V4_n$) are calculated on the basis of the respective rotational velocity of the four wheel tires Wi of the vehicle.

For instance, wheel speed data of the respective wheel tires Wi obtained from a sensor such as an ABS sensor at a certain time point are defined to be wheel speeds $V1_n$, $V2_n$, $V3_n$, and $V4_n$.

2) The average wheel speeds ($Vf_n$, $Vd_n$) of the following wheels and driving wheels are calculated.

When the vehicle is of front-wheel driving type, average wheel speeds $Vf_n$, $Vd_n$ of the following wheels and the driving wheels at a certain time point are calculated on the basis of the following equations (1) and (2).

$$Vf_n = (V3_n + V4_n)/2 \quad (1)$$

$$Vd_n = (V1_n + V2_n)/2 \quad (2)$$

3) The acceleration/deceleration of the vehicle (that is, average wheel acceleration of the following wheels) $Af_n$ is calculated.

When a wheel speed data preceding the average wheel speed $Vf_n$ of the following wheels by one is defined to be average wheel speed $Vf_{n-1}$, the acceleration/deceleration $Af_n$ of the vehicle is respectively obtained from the following equation (3).

$$Af_n = (Vf_n - Vf_{n-1})/\Delta t/g \quad (3)$$

Here, $\Delta t$ denotes a time interval (sampling time) between wheel speed $Vf_n$ and $Vf_{n-1}$ as calculated from the wheel speed data, and g acceleration of gravity. The sampling time needs to be not more than 1 second in order to reduce variations in data and allowing judgment in a short time. This time is preferably not more than 0.05 second.

4) The slip rate $S_n$ is calculated from the following equation (4) on the basis of the ratio of the average wheel speed $Vd_n$ of the driving wheels among the wheel speeds to the vehicle speed (average wheel speed $Vf_n$ of the following wheels).

$$S_n = Vd_n/Vf_n \quad (4)$$

5) Then, data of the slip rate and acceleration/deceleration of the vehicle are processed to undergo moving-averaging for every sampling time.

Upon sampling data for each short sampling time, for instance, several tens of ms, and performing moving-averaging of data including large variations which have been obtained during this sampling time, it is possible to reduce variations in data without reducing the number of data.

As for the slip rate, $$MS_n = (S_1 + S_2 + \ldots + S_n)/N \quad (5)$$

$$MS_{n+1} = (S_2 + S_3 + \ldots + S_{n+1})/N \quad (6)$$

$$MS_{n+2} = (S_3 + S_4 + \ldots + S_{n+2})/N \quad (7)$$

As for the acceleration/deceleration of the vehicle, $$MAf_n = (Af_1 + Af_2 + \ldots + Af_n)/N \quad (8)$$

$$MAf_{n+1} = (Af_2 + Af_3 + \ldots + Af_{n+1})/N \quad (9)$$

$$MAf_{n+2} = (Af_3 + Af_4 + \ldots + Af_{n+2})/N \quad (10)$$

6) When the acceleration/deceleration is within a specified range proximate to zero, for instance, ±0.005 G, a value for the slip rate within this range is obtained. When a plurality of slip rates satisfying the condition that the acceleration/deceleration of the vehicle is proximate to zero is present within the specified period of time, an average value of these slip rates is obtained.

7) The average value of the slip rate of step 6) is compared with the preliminarily obtained slip rate under normal air pressure. More particularly, when a difference, which is the comparison value, is compared with the specified threshold, and found to be larger than the threshold, simultaneous decompression of both front wheel tires or simultaneous decompression of both rear wheel tires is judged.

While the present invention will now be explained on the basis of examples thereof, the present invention is not to be limited to such examples only.

EXAMPLE

An FF (front engine/front drive) vehicle attached with tires of normal air pressure ($2.2 \times 10^5$ Pa) was provided. The tire size of the tires was 215/50R17. A running condition for the vehicle was a condition in which the vehicle was made to run on a straight course at a constant speed (80 km/h) with two persons riding thereon.

Figure 3:
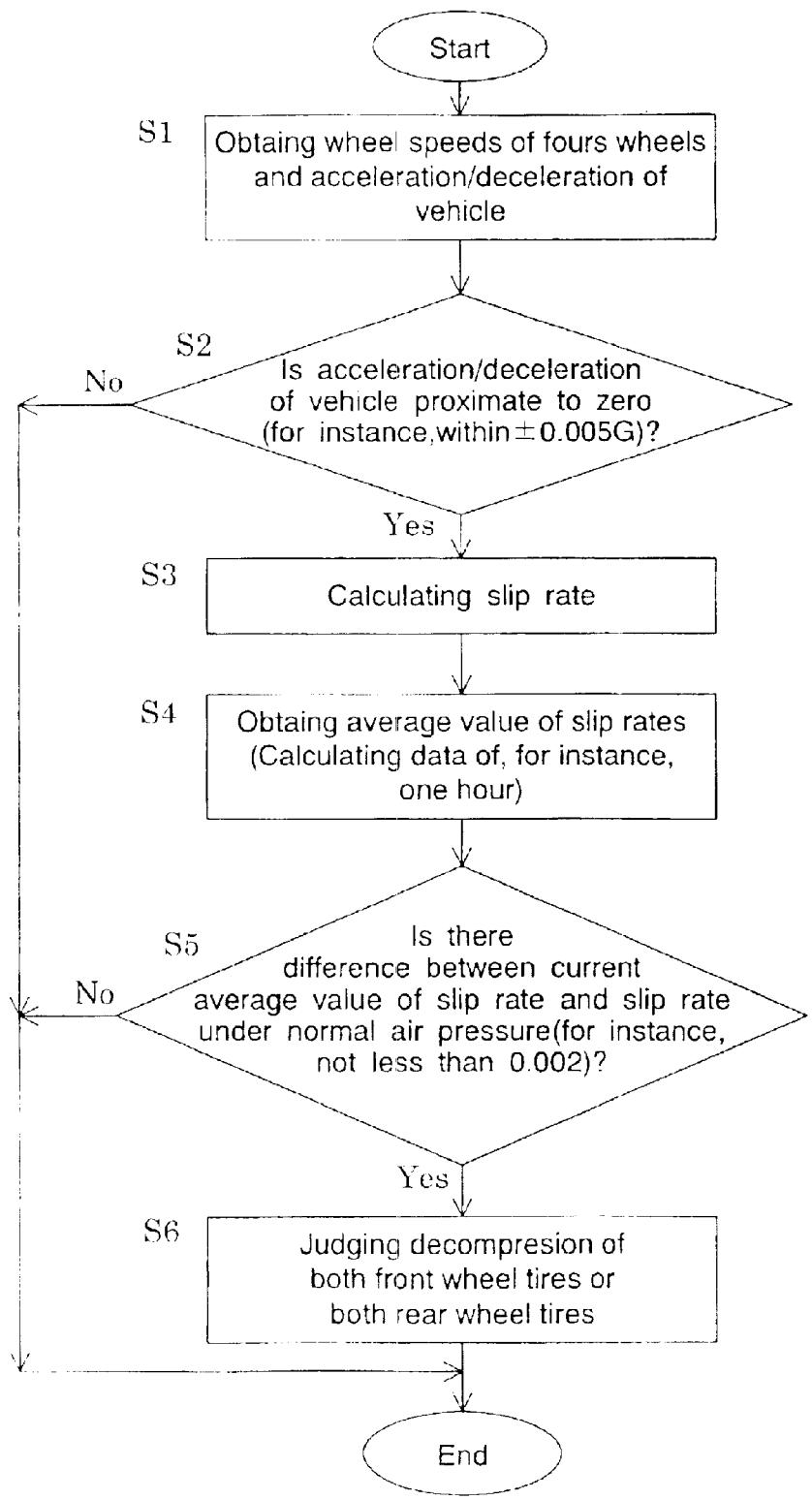
FIG. 3 is one example of a flowchart of the present invention.

Wheel speeds of the four wheels are sampled during running. In order to obtain a large number of data while eliminating variations or measuring errors, the sampling time for the wheel speed of the wheels was set to 40 msec. As illustrated in FIG. 3, the average wheel speed of the following wheels was defined to be the vehicle speed whereupon the vehicle speed was differentiated by the sampling time to obtain an acceleration/deceleration of the vehicle (Step S1).

Upon performing moving-averaging of the slip rates obtained on the basis of a ratio of the average wheel speed of the following wheels to the vehicle speed and of the acceleration/deceleration of the vehicle, it is determined whether data in which the acceleration/deceleration of the vehicle is within the specified range of ±0.005 G are present within two seconds (Step S2). If data was present within the specified range, the slip rate corresponding to this acceleration/deceleration was calculated (Step S3). An average value was obtained from data of slip rates obtained for, for instance, one hour (Step S4).

In the above steps, the preliminarily obtained slip rate under normal air pressure was 1.001. The average value of current slip rates of 1.0035 was obtained from data obtained when the vehicle was made to run on public road for approximately one hour upon decompressing both wheel tires of the front wheels by 30%.

It is then determined whether there is a difference between the current average value of slip rates and the slip rate under normal air pressure (Step S5). Since an absolute value of the difference between these slip rates 0.0025 (|0.001−1.0035|) is not less than the specified threshold of, for instance, 0.002, it could be judged that both wheel tires of the front wheels have simultaneously decompressed (Step S6).

As explained so far, it is possible to judge simultaneous decompression of both front wheel tires or both rear wheel tires when employing the present invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for judging decompression of tire based on rotational information obtained from tires attached to a vehicle; said method comprising the steps of: detecting rotational information of the respective tires; storing the rotational information of the respective tires; obtaining an acceleration/deceleration of the vehicle; obtaining a slip rate when the acceleration/deceleration of the vehicle is within a specified range proximate to zero; comparing the slip rate with a slip rate which has been preliminarily obtained when the tire is under normal air pressure; and judging simultaneous decompression of both front wheel tires or simultaneous decompression of both rear wheel tires on the basis of a relationship between a value obtained through comparison of the two slip rates and a specified threshold.

2. An apparatus for judging decompression of a tire based on rotational information obtained from tires attached to a vehicle; said apparatus comprising: rotational information detecting means for detecting rotational information of the respective tires; a rotational information storing means for storing the rotational information of the respective tires; an acceleration/deceleration calculating means for obtaining an acceleration/deceleration of the vehicle; a slip rate calculating means for obtaining a slip rate when the acceleration/deceleration of the vehicle is within a specified range proximate to zero; a slip rate comparison means for comparing the slip rate with a slip rate which has been preliminarily obtained when the tire is under normal air pressure; and a decompression judging means for judging simultaneous decompression of both front wheel tires or simultaneous decompression of both rear wheel tires on the basis of a relationship between a value obtained through comparison of the two slip rates and a specified threshold.

3. A program for judging decompression of a tire, in which for judging decrease in tire air-pressure, said program containing instructions for a computer to function as a rotational information storing means for storing the rotational information of the respective tires; an acceleration/deceleration calculating means for obtaining an acceleration/deceleration of the vehicle; a slip rate calculating means for obtaining a slip rate when the acceleration/deceleration of the vehicle is within a specified range proximate to zero; a slip rate comparison means for comparing the slip rate with a slip rate which has been preliminarily obtained when the tire is under normal air pressure; and a decompression judging means for judging simultaneous decompression of both front wheel tires or simultaneous decompression of both rear wheel tires on the basis of a relationship between a value obtained through comparison of the two slip rates and a specified threshold.

* * * * *